(12) United States Patent
Haustein et al.

(10) Patent No.: US 7,672,754 B1
(45) Date of Patent: Mar. 2, 2010

(54) BALANCING OF DATA TAPE CARTRIDGES IN TAPE LIBRARIES WITH PASS-THROUGH MECHANISM

(75) Inventors: Nils Mia Haustein, Soergenloch (DE); Rainer Wolafka, Hofheim-Langenhain (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/368,687

(22) Filed: Feb. 10, 2009

(51) Int. Cl.
*G06F 7/00* (2006.01)
*G06F 12/00* (2006.01)
*G06F 13/00* (2006.01)
*G06F 13/28* (2006.01)

(52) U.S. Cl. ...................... 700/214; 711/111
(58) Field of Classification Search ............... 700/214, 700/213, 218; 711/111, 100; 369/30.01, 369/27.01; 360/69, 72.3
See application file for complete search history.

(56) References Cited

U.S. PATENT DOCUMENTS

| | | | |
|---|---|---|---|
| 6,085,123 A * | 7/2000 | Baca et al. | 700/214 |
| 6,574,173 B1 * | 6/2003 | Manes | 369/30.48 |
| 7,009,798 B1 | 3/2006 | Gupta et al. | |
| 7,472,245 B2 * | 12/2008 | Camble et al. | 711/163 |
| 7,505,980 B2 * | 3/2009 | Tyndall et al. | 707/100 |
| 2004/0221101 A1 * | 11/2004 | Voorhees et al. | 711/111 |
| 2005/0043852 A1 | 2/2005 | Gallo et al. | |
| 2005/0219964 A1 | 10/2005 | Pollard et al. | |

* cited by examiner

*Primary Examiner*—Gene Crawford
*Assistant Examiner*—Ramya Prakasam
(74) *Attorney, Agent, or Firm*—Yee & Associates, P.C.; Ray Ventura (57) ABSTRACT

A computer-implemented method for balancing data tape cartridge utilization in an automated tape library system identifies a current number of data tape cartridge mounts per library string and identifies a target number mounts per the library string to identify a difference between the target number and the current number as a delta number of data tape cartridges to move. The number of data tape cartridge mounts per data tape cartridge per library string is identified and a data tape cartridge to move is selected by identifying a unique identifier of the data tape cartridge with the highest number of mounts, and having a lowest number of moves, to form a selected data tape cartridge, and creates a move request for the selected data tape cartridge. The move request is sent to the automated tape library for execution, and a move counter for each data tape cartridge moved is incremented.

1 Claim, 3 Drawing Sheets

BALANCING OF DATA TAPE CARTRIDGES IN TAPE LIBRARIES WITH PASS-THROUGH MECHANISM

BACKGROUND OF THE INVENTION

1. Field of the Invention

The present invention relates generally to data processing systems and, more specifically, to a computer-implemented method for the balancing of data tape cartridge utilization in automated tape libraries with pass-through mechanisms.

2. Description of the Related Art

With the continuously growing amount of information and new regulations for data archiving, more and more data needs to be managed and stored as back up. Typically, tape storage is still the most used backup medium for larger volume of data. With the current focus towards "green information technology," tape as backup medium may become even more important in the future. Capacity and environmental aspects, together with the excellent disaster recovery attributes of tape storage (such as placing data on tape cartridges in offsite vaults), will typically preserve the importance of data stored on tape media relative to other media.

In enterprise data centers, automated tape libraries are commonly used to provide a backup capability for data. Automated tape library systems are generally available from a number of vendors. The automated tape libraries can house hundreds of tape drives and thousands of data tape cartridges. In some cases, automated tape libraries, or so-called tape silos, include a "pass-through mechanism." For example, the entire library consists of multiple library strings, or tape silos, that are connected to each other via a mechanism that allows traversal of tape cartridges from one tape library string to another tape library string. Each library string, or tape silo, has an inventory of cartridges and tape drives. The inventory of tape cartridges and tape drives differs between the different library strings and tape silos. Cartridges may be one of two types. A first type is a "scratch" type, or empty cartridge. The second type is a "data/private" type in which the tape cartridge contains valid data. Scratch cartridges are typically used for new backups.

During backup or restore operations from tape cartridges, a situation can occur over time in which in one library string, or tape silo, all of the drives are statistically used more frequently than drives in another library string, or tape silo. In an extreme case, mount requests cannot be executed because all drives in the library string are busy at the same time. In such cases, the backup server has to wait until one drive becomes free. Such an event typically implies an impact on the backup application, and therefore, users of the library because the backup operation may not complete in time.

Solutions have been provided to move tape cartridges between library strings in the situation when no drive is available for a mount in the current string. The movement of the tape cartridges, however, occurs at the time when the backup operation started, which causes a delay in the backup operation.

BRIEF SUMMARY OF THE INVENTION

According to one embodiment of the present invention, a computer-implemented method for balancing data tape cartridge utilization in an automated tape library system, obtains a current number of data tape cartridge mounts per library string in the automated tape library system to form a total number of mounts per library string, and identifies a target number of data tape cartridge mounts per library string as equal to the number of drives per library string multiplied by the number of total mounts in the automated tape library system and divided by the total number of drives in the automated tape library system to form the target number of data tape cartridge mounts per library string. The computer-implemented method identifies a delta number of data tape cartridges to move, as a difference between the total number of mounts per library string and the target number of data tape cartridge mounts per library string, identifies a number of data tape cartridge mounts per data tape cartridge per library string to form the number of tape data cartridge mounts per data tape cartridge, and identifies a unique identifier of each move candidate, wherein a move candidate is a tape data cartridge in a tape library string having a delta number greater than zero. The computer-implemented method further determines whether the unique identifier of the each move candidate is not in a same library string, and responsive to a determination that the each move candidate is not in the same library string, identifies a set of unique identifiers of data tape cartridges according to the number of data tape cartridge mounts per data tape cartridge, to form a set of highest mount unique identifiers and selects a set of data tape cartridges to move, wherein each data tape cartridge in the set of data tape cartridges to move is selected from the set of highest mount unique identifiers having a lowest number of moves, to form the selected set of data tape cartridges. The computer-implemented method further creates a move request for the selected set of data tape cartridges to form a created move request, sends the created move request to the automated tape library system for execution, and incrementing a move counter for each data tape cartridge moved.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus, to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 3:
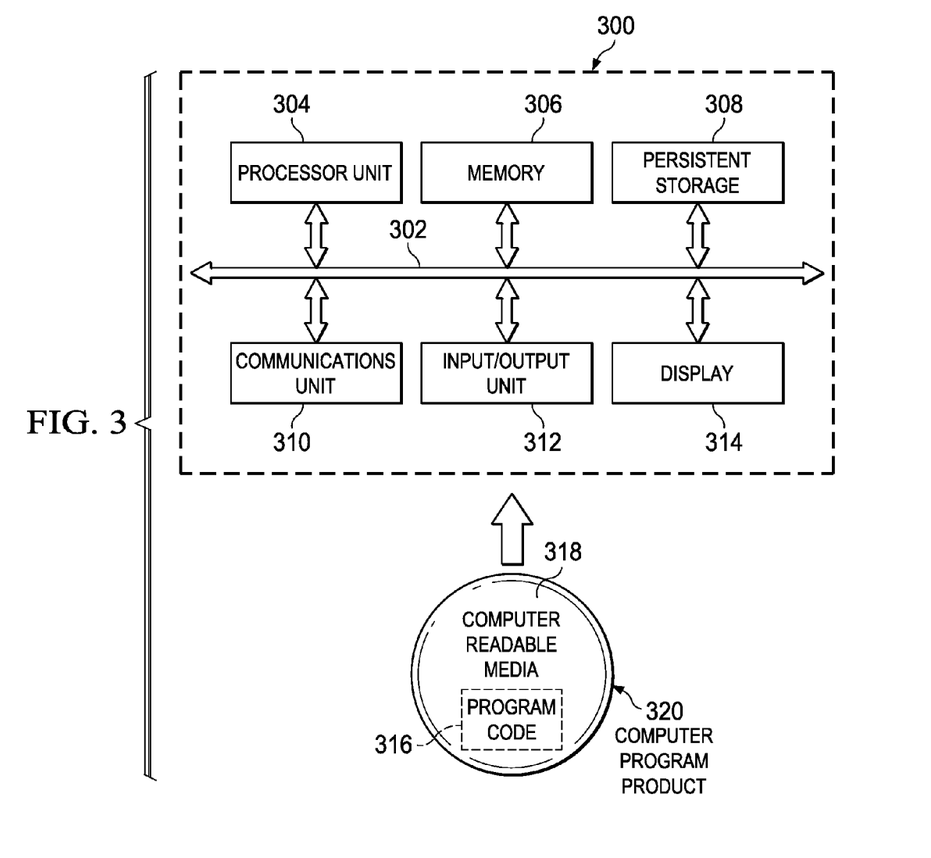
FIG. 3 is a block diagram of a data processing system in which illustrative embodiments may be implemented.

With reference now to the figures, and in particular with reference to FIG. 3, exemplary diagrams of data processing environments are provided in which illustrative embodiments may be implemented. It should be appreciated that FIG. 3 is only exemplary and is not intended to assert or imply any limitation with regard to the environments in which different embodiments may be implemented. Many modifications to the depicted environments may be made.

Figure 1:
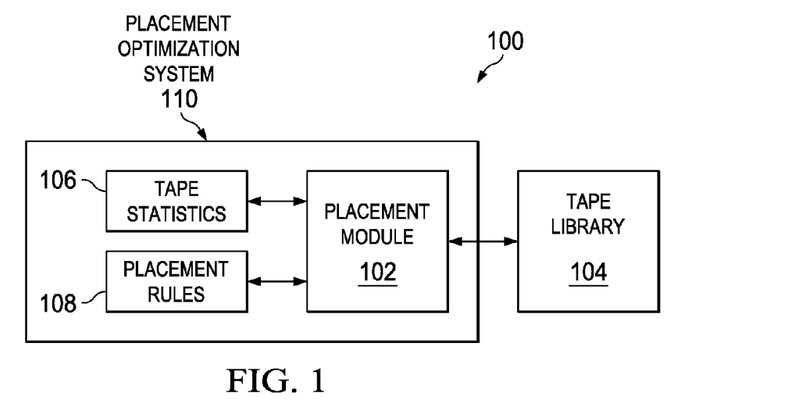
FIG. 1 is a block diagram of components of a system for balancing data tape cartridge utilization, in accordance with illustrative embodiments.

With reference to FIG. 1, a block diagram of components of system 100 for balancing data tape cartridge utilization is presented, in accordance with illustrative embodiments. The components of system 100 may be implemented within or as extensions to system 300 of FIG. 3. System 100 is typically implemented as a combination of hardware and software. Components of placement module 102, tape statistics 106 and placement rules 108 combine to form a placement optimization system 110 capability within system 100.

For example, placement module 102 may be implemented as a tape library service in the form of hardware, software or hardware and software to control the selection and movement of tape data tape cartridges. Placement module 102 interacts with the devices of tape library 104 by way of an interface typically provided for managing the tape library. Placement module 102 typically uses a set of commands to direct the tape library to moves specific tape data tape cartridges to a selected location.

Placement module 102 determines which tape data tape cartridges to relocate based on information captured and maintained in tape statistics 106. Tape statistics 106, typically implemented as a combination of hardware and software, stores utilization information generated by tape library 104. Tape statistics 106 includes information regarding the number of tape cartridge mounts by device (tape drive) and by string, as well as other utilization statistics representative of the tape library. Utilization information for a specific data tape cartridge is tracked by a unique identifier the data tape cartridge that is typically the volume serial number or "volser."

Placement rules 108, typically implemented as a set of software logic, but may also be a composition of hardware and software or hardware, provides a capability to flexibly determine an action based on an event occurring in the tape library. An event is typically one of a mount request, a mount, a dismount, a cartridge transfer and other cartridge utilization or cartridge inventory associated information. Placement rules 108 is used by placement module 102 with data from tape statistics 106 to select tape cartridges to relocate within tape library 104. For example, a rule may have a defined condition, such as "when the number of mounts for a data tape cartridge is greater than a specified threshold," and a corresponding action such as "identify the volser as a candidate for a move."

Figure 2:
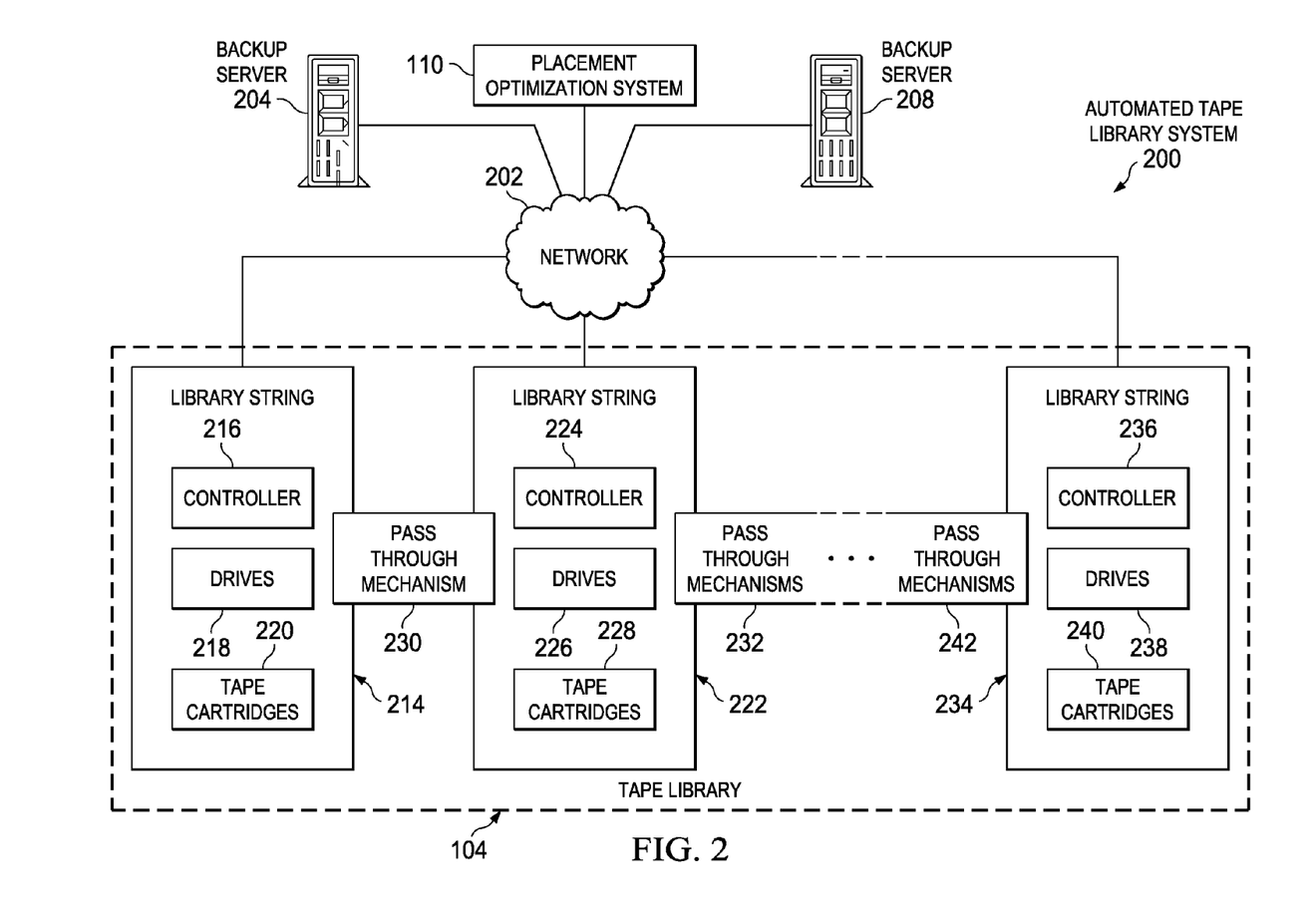
FIG. 2 is a block diagram of a tape library system with a pass-through mechanism, of FIG. 1, in accordance with illustrative embodiments.

With reference to FIG. 2, a block diagram of a tape library system with a pass-through mechanism is presented in accordance with illustrative embodiments. Tape library system 200 is an example of a tape library system using tape library 104, with placement module 102, tape statistics 106 and placement rules 108 of placement optimization system 110 of FIG. 1 while providing more detail of tape library 104. Placement optimization system 110 is connected to tape library strings 214, 222 and 234 represented as tape library 104 in FIG. 1. Components of placement module 102, tape statistics 106 and placement rules 108 forming placement optimization system 110 as illustrated, provides an example of how software and hardware may be packaged to provide placement optimization system 110 of FIG. 1.

Tape library system 200 includes a pass-through mechanism, such as pass through mechanism 230, and tape data tape cartridge balancing by placement optimization system 110. Placement optimization system 110 is connected to a network, such as network 202. Additional connections are provided to backup servers 204, and 208 and all tape library strings 214, 222 and 234 pertaining to a single library image of tape library 104. Each tape library string has its own identifier which might be a unique serial number. Placement optimization system 110 communicates with the backup application on backup servers 204, and 208 through network 202 to identify the number of tape data tape cartridges per library.

The communication between the backup servers 204 and 208 and the tape library strings 214, 222 and 234 can for example, be based on application programming interfaces currently used, such as Internet small computer system interface or vendor-specific protocols. The communication can also take place via a separate management network which is not shown. Placement optimization system 110 also communicates to each library string 214, 222 and 234 via network 202 to instruct tape library 104 to move a tape data tape cartridge from one library string to another library string via pass-through mechanisms 230, 232, and 242. The communication can, for example, be based on the small computer system interface command set using a SCSI MOVE MEDIUM command. Placement optimization system 110 may further maintain a data structure to contain statistical data used in the tape data tape cartridge utilization balancing process.

The different library strings each have an identifier, as in 214, 222 and 234. Associated with each string is inventory of tape drives such as drives 218, 226 and 238, and tape cartridges 220, 228, and 240. Further, each string has a control component managing pass-through operations, such as controllers 216, 224 and 236. A pass-through management component, such as controller 216, can also be used to instruct one library string, such as library string 214, to move a tape data tape cartridge to library string 222. The various library strings are connected via pass-through mechanisms 230, 232, and 242 that allow tape data tape cartridges to be moved between library strings. The pass-through mechanism might be an exchanger which transports the tape cartridges from one library string to another library string through an opening in both library strings.

The library image of tape library 104 is accessed by a plurality of backup servers 204, and 208 which are connected through network 202. Each backup server hosts a backup application with a capability to write data to tapes housed in tape library strings 214, 222 and 234, and also reads data from the same tapes. Network 202 may typically be a storage network implementing various standards based or proprietary network protocols as needed for connectivity and device support.

Using the example of system 200 of FIG. 2, placement optimization system 110 may be implemented on an administration client connected to backup servers such as backup server 204 and 208 and library strings with pass-through mechanism pertaining to a library image, such as tape library 104, through a network, such as network 202. Placement module 102 of placement optimization system 110 determines the number of data tape cartridge mounts for each library string within a given time period and calculates an optimal number of mounts for each library string and stores these numbers in the tape statistics 106 of system 100 of FIG. 1. Subsequently, the placement module identifies a set of data tape cartridges to be moved based on a predefined number of mounts per data tape cartridge within a given time period and a predefined number of moves of the data tape cartridge during the lifecycle. The placement module further instructs the library string to move selected data tape cartridges to another library string utilizing the pass-through mechanism, and updates the move counter for the data tape cartridges which have been moved. The process of the placement optimization system provides a capability to distribute data tape cartridges across library strings to achieve a balanced number of mounts for each library string in the library image.

The placement optimization system typically includes a data structure, such as a table of values, in which is calculated an optimum number of mounts and the number of data tape cartridges to be moved. The data structure may further comprise a table which is used to select data tape cartridges identified by a unique identifier of a volume/serial number (volser) and library string identifier, which are candidates for movement based on the data tape cartridges having a combination of the most number of mounts and least number of moves. These data structures are stored in the tape statistics 106 of system 100 of FIG. 1.

Movement is triggered for cartridges proactively, prior to an operation requesting the tape cartridge, based on predetermined rules and policies which are stored in placement rules 108 of FIG. 1 and which are explained later. Proactive movement attempts to prevent problems related to inefficient tape resources placement that may cause performance degradation before a mount request is received by a backup application.

With reference now to FIG. 3, a block diagram of a data processing system is shown, in which illustrative embodiments may be implemented. Data processing system 300 is an example of a computer, such as that used in placement optimization system 110 of system 100 of FIG. 1, in which computer-usable program code or instructions implementing the processes may be located for the illustrative embodiments. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software, such as the instructions of placement module 102 and placement rules 108 that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information, either on a temporary basis and/or a permanent basis. Memory 306, in these examples, may be, for example, a random access memory or any other suitable volatile or non-volatile storage device. Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308. Persistent storage 308 provides a capability to store data gathered as tape statistics 106 or placement rules 108, of FIG. 1, for processing.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer-implemented instructions, which may be located in a memory, such as memory 306. These instructions are referred to as program code, computer-usable program code, or computer-readable program code that may be read and executed by a processor in processor unit 304. The program code in the different embodiments may be embodied on different physical or tangible computer-readable media, such as memory 306 or persistent storage 308.

Program code 316 is located in a functional form on computer-readable media 318 that is selectively removable and may be loaded onto or transferred to data processing system 300 for execution by processor unit 304. Program code 316 and computer-readable media 318 form computer program product 320 in these examples. In one example, computer-readable media 318 may be in a tangible form, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to data processing system 300. The tangible form of computer-readable media 318 is also referred to as computer-recordable storage media. In some instances, computer-readable media 318 may not be removable.

Alternatively, program code 316 may be transferred to data processing system 300 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code.

In other illustrative embodiments, program code 316 may be downloaded over a network to persistent storage 308 from another device or data processing system for use within data processing system 300. For instance, program code stored in a computer-readable storage medium in a server data processing system may be downloaded over a network from the server to data processing system 300. The data processing system providing program code 316 may be a server computer, a client computer, or some other device capable of storing and transmitting program code 316. Program code 316 provides an embodiment of the components of placement module 102, and placement rules 108 of FIG. 1.

The different components illustrated for data processing system 300 are not meant to provide architectural limitations to the manner in which different embodiments may be implemented. The different illustrative embodiments may be implemented in a data processing system including components in addition to, or in place of, those illustrated for data processing system 300. Other components shown in FIG. 3 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer-readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

With reference to Table I, a tabular representation of a data structure for maintaining data tape cartridge inventory and movement trigger data, for automated tape library system 200 of FIG. 2, is presented in accordance with illustrative embodiments. The data structure of Table I is depicted as an exemplary tabular structure but is not limited to the specific embodiment shown.

TABLE I

| Library String | Current Mounts | Target Mounts | Delta |
|---|---|---|---|
| A | 300 | 200 | −100 |
| B | 200 | 100 | −100 |
| C | 800 | 1000 | +200 |

The table illustrates a private or data tape inventory and movement trigger, arranged by tape library string. Table I is an example of collected data that is stored in tape statistics 106 of placement optimization system 110 of system 100 of FIG. 1. The data in this table is collected by placement module 102 which communicates with tape library 104 of FIG. 1 via network 202 of FIG. 2. For example, the library string column has a row containing a unique identifier for each tape library string capable of participating in a data tape movement. In this example, the library string column depicts library string A, library string B and library string C. Each library string has a unique identifier within the library.

The current mounts column shows the number of current tape cartridge mounts for each tape library string. Placement module 102 obtains the number of mounts from the backup server through network 202 of FIG. 2. Since there might be multiple backup servers storing data on tapes in one library string, the number of mounts in the current mounts column is typically the sum of all tape mounts in this library string for all backup servers. The current mounts column shows 300 tape mounts for library A, 200 tape mounts for library B, and 800 tape mounts for library C.

The target mounts column represents the target mount count for each library string, in this example, 200 per tape library string A, 100 mounts for library string B and 1000 mounts for library string C. The target mount count per string is stated as (#TargetMounts/LibString<n>) and is calculated by placement module 102, of FIG. 1, using an equation shown in Table II. Placement optimization system 110 communicates to one or more library strings 214, 222 and 234 by network 202, all of FIG. 2, to determine the total number of drives per library string expressed as (#Drives/LibString<n>) and the total number of drives for the library image, expressed as (#TotalDrives). The total number of target tape mounts is derived from the target mounts column.

The delta column shows a delta or mathematical difference between the target match counts column and the actual or current mounts column. A difference greater than zero typically indicates a requirement for balancing. In this example, the delta column shows rows values of minus 100, minus 100 and a plus 200. Tape library strings A and B are over target while tape library string C is under target. The result is used to move data tape cartridges into and out of the tape library. Placement module 102 of FIG. 1, periodically updates values in the data structure shown in Table I by determining the current mounts count per library string and the target mounts count.

Table II is a textual representation of an equation for calculating tape data tape cartridge optimization using placement module 102 of FIG. 1, in accordance with illustrative embodiments. Placement optimization system 110 of FIGS. 1 and 2 is an example of a combination of hardware and software providing a capability of placement optimization system 110 of FIG. 1 that determines optimized data tape cartridge utilization in an automated tape library system.

TABLE II $$\frac{\text{\#TargetMounts/LibString}\langle n\rangle}{\text{\#Drives/LibString}\langle n\rangle} = \frac{\text{\#TotalMounts}}{\text{\#TotalDrives}} \quad (A)$$

$$\text{TargetMounts/LibString}\langle n\rangle = \text{\#Drives/LibString}\langle n\rangle * \frac{\text{\#TotalMounts}}{\text{\#TotalDrives}} \quad (B)$$

A basic goal is to continuously or periodically monitor the inventory of data tape cartridges and proactively optimize the placement of the data tape cartridges in the automated tape libraries with a pass-through mechanism. The pass-through mechanism provides a capability that when a data tape cartridge is requested by a backup application; the request can be served immediately without the need to potentially do a traversal of tape cartridges between library strings via the pass-through.

The optimization process of placement optimization system 110 of FIGS. 1 and 2 can be running continuously in the background, at certain intervals in the background, or manually triggered by an operator. The first two options are typically performed entirely by the tape library itself without any user intervention. The process of placement optimization system 110 attempts to ensure that when a private mount is requested by a backup application, the mount request can be served immediately without the need to potentially perform a traversal of cartridges between library strings.

Data tape cartridge optimization is based on the number of cartridge mounts and the number of cartridge moves. Tape drives have to be considered in the equation as well, because optimal placement of cartridges is possible only when there are drives available for a mount request. The relation just described is shown in the equations of Table II.

Equation (A) depicts a relation between a tape library string inventory and an overall tape library string inventory. On the left side of equation (A), is stated the number of target mounts per library string (for each specific library string) divided by the number of drives per library string (for the same specific string). On the right side of equation (A), is stated the number of total mounts in the tape library divided by the total number of drives in the tape library.

Based on the relation in equation (A) showing the number of mounts to the number of drives, the equation for a calculation of the target scratch cartridges in a library string is re-stated as equation (B). Beginning from the left, the number of target mounts per library string (for a specific string number), is identified as being equal to the number of drives per library string, (for the same string number), multiplied by the number of total mounts in the tape library, divided by the total number of drives in the tape library. The relation just described in the equations of Table II is an example of rules that may be used by the placement module. Other rules may be used to alter the allocation of data tape cartridges toward specific library strings in a purposive manner.

Table III, is a tabular representation of a data structure for maintaining tape data tape cartridge mount and movement data, for automated tape library system 200 of FIG. 2, in accordance with illustrative embodiments. The data structure of Table III is an example of a data structure in the form of table that maintains information by library string for a number of mounts and moves with respect to data tape cartridges as used in equation (B) of Table II. Table II is another example of data stored in tape statistics 106 of placement optimization system 110 of system 100 of FIG. 1.

TABLE III

| Library String | Cartridge volser | Mounts | Moves |
| --- | --- | --- | --- |
| A | AAAAAA | 100 | 0 |
| A | BBBBBB | 0 | 0 |
| ... | ... | ... | ... |
| B | DDDDDD | 200 | 2 |
| B | EEEEEE | 73 | 1 |
| ... | ... | ... | ... |
| C | FFFFFF | 120 | 0 |
| C | GGGGGG | 150 | 1 |
| ... | ... | ... | ... |

In the left column, library string, is stored a unique identifier of each library string. For example, the column indicates library string A, library string B and library string C. The next column, cartridge volser identifies a unique identifier of the data tape cartridge volume serial number (volser) used for each data tape cartridge in each library string. For example, the column indicates volser "AAAAAA" is used in library string "A." Similar information is shown for library strings "B" and "C."

The mounts column indicates the number of mounts of each data tape cartridge identified by the volser of the cartridge volser column. Placement optimization system 110 of FIG. 2, obtains this information from the backup servers 204 and 208 of FIG. 2. Usually, only one backup server owns and mounts a given data tape cartridge. For example, the first row of the mounts column indicates 100 mounts for volser "AAAAAA," while the next row indicates "0" mounts for volser "BBBBBB" on library string "A." The remaining rows indicate similar information for other volser and library string combinations.

The moves column identifies the number of moves per data tape cartridge per library string. The number indicates how often a given data tape cartridge identified by a unique identifier of volser has been moved over its lifetime. For example, the first row indicates "0" moves, while the fourth row indicates "2" moves for volser "DDDDDD" of library string "B."

The selection of a data tape cartridge to be moved from one library string to another is based on the number of mounts, from the mounts column, and the number of moves, from the move column. Thereby, a data tape cartridge is identified as a candidate for a move by being in a library string negative delta and having a combination of the most number of mounts and the least number of moves. Placement optimization system 110 of FIGS. 1 and 2 provides a capability to programmatically balance the number of data tape cartridges in a library string associated with a single library image based on the number of mounts, moves and drives.

Figure 4:
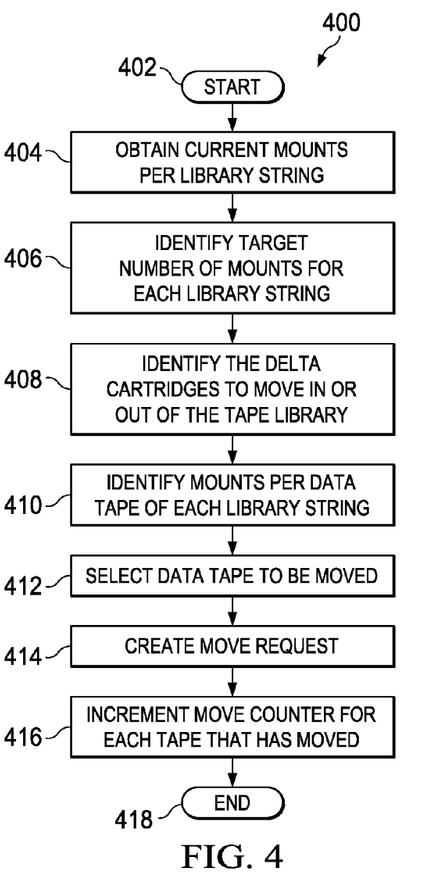
FIG. 4 is a flow diagram of a process for balancing data tape cartridge utilization in a tape library system of FIG. 2, in accordance with illustrative embodiments.

With reference to FIG. 4, a flow diagram of a process for balancing tape data tape cartridge utilization in a tape library image such as tape library 104 of FIG. 2 is presented, in accordance with illustrative embodiments. Process 400 is an example of a process using placement optimization system 110 of FIG. 2 and more particular the placement module 102 and tape statistics 106 with placement rules 108, all of FIG. 1.

Process 400 starts (step 402) and obtains current mounts per library (step 404). The current number of mounts per tape library string is determined by the placement module 102 and stored in tape statistics 106 of placement optimization system 110 of system 100 of FIG. 1. The number of mounts is typically determined for the time between the present and the last time the process ran. The current number of mounts is stored in a data structure, such as the data structure of Table I.

Identify an optimal or target number of mounts for each library string using equation (B) of Table II and store the result in the target mounts column of the data structure of Table I is performed by placement module 102 (step 406). The result forms the target number of data tape cartridges mounts per library string. Identify the delta cartridges to be moved in or out of the tape library for each tape library string and update the data structure of Table I is performed by placement module 102 (step 408). The number of tape cartridges to be moved is the difference between the total current or actual mounts per library string and the target number of data tape cartridge mount counts. When there is difference the cartridges require balancing and when the difference is a negative value, cartridges should be reallocated because the cartridges are not being used.

Identify the mounts per data tape cartridge of each library string, by contacting a backup server (204 and 208 in FIG. 2), or set of servers, is performed by placement module 102 (step 410). The number of data tape cartridge mounts per data tape cartridge is determined for the time period between the present and the last time process 400 was executed. The number of mounts and with the data tape cartridge unique identifier (volser) is stored as a result in columns mounts and cartridge volser respectively for each library string indicated in the library string column of the data structure depicted in Table III which is stored in tape statistics 106.

Select data tape to be moved is performed (step 412). The selection is based on information in the data structures of Table I and Table III. From the data structure of Table I, using the delta column a determination is made as to how many data tape cartridges are to be moved in or out of a library string. From the data structure of Table III a determination is made as to the volser of the data tape cartridges to be moved. Data tape cartridges are selected according to the unique identifier of volser which are not in the same library string and where the number of mounts for each data tape cartridge is the highest while the number of moves for the same volser is the lowest. The combination of highest mounts with the lowest moves provides a capability to move active cartridges that have not been moved previously or moved as often as other cartridges.

Create move request is performed to generate the move requests to the tape library system (step 414). The move requests cause the tape library system to move the selected data tape cartridges. Placement module 102 of placement optimization system 110 of system 100 of FIG. 1 instructs the control module (216, 224, 236 of FIG. 2) for the respective library string (214, 222, 234 of FIG. 2) to move the data tape cartridges from one library string to another library string via the pass-through mechanism.

Increment move counter for each data tape cartridge moved is performed (step 416). The moves column of the data structure of Table III is updated to reflect movement of the data tape cartridges identified by volser which have been moved by the move request in step 414. Process 400 terminates hereafter (step 418).

In summary, process 400 provides a capability to ensure that the number of mounts is balanced in each library string of a library image by moving data tape cartridges, which are frequently used by a backup server from one library string to another. The process thereby utilizes placement module 102 of FIG. 1 which communicates with the backup servers 204 and 208 of FIG. 2 to determine the number of mounts, and to the library strings to determine the number of tape drives available. The target mount count for each library string is calculated and a determination is made as to the number of data tape cartridges to be moved. A determination of which data tape cartridges to be moved is performed by analyzing the number of mounts for each data tape cartridge and the number of moves previously made for each candidate volser. Move requests are generated by placement module 102 for the identified data tape cartridges that instruct the control modules of the library strings to move selected data tape cartridges using the pass-through mechanism, typically before the data tape cartridges are required in the new location.

Figure 5:
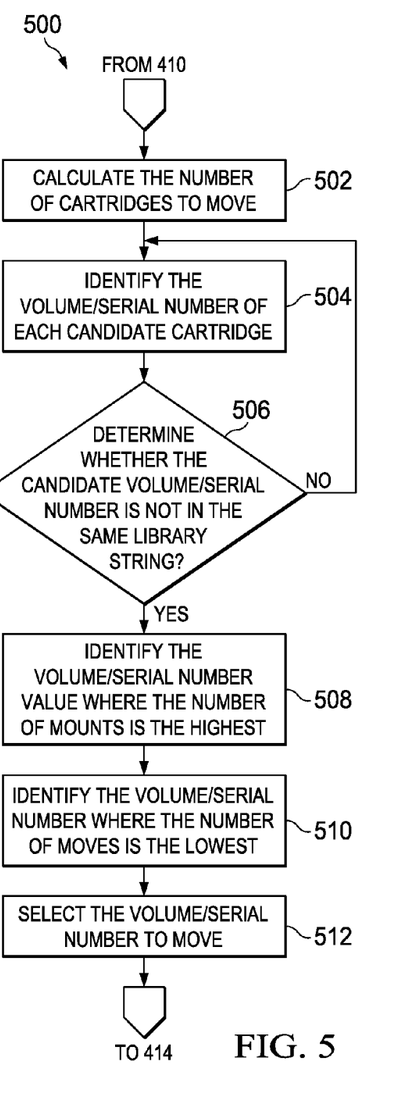
FIG. 5 is a flow diagram of process for determining a data tape cartridge volume to move, within the process of FIG. 4, in accordance with illustrative embodiments.

With respect to FIG. 5, a flow diagram of a process for determining a data tape cartridge volume to move, within the process of FIG. 4 is presented, in accordance with illustrative embodiments. Process 500 is an example of a process of selecting a data tape to be moved as in step 412 of process 400 of FIG. 4 and is executed by the placement optimization system 110 of system 100 and more particular by placement module 102 in conjunction with the data stored in tables I-III of tape statistics 106 of FIG. 1.

Process 500 is invoked by step 410 of process 400 and calculates the number of cartridges to move (step 502). The number of data tape cartridges to move may be determined by summing the delta values of the delta column of the data structure of Table I stored in the tape statistics 106 of FIG. 1. Identify the volume/serial number (volser) of each candidate data tape cartridge is performed (step 504). The volume serial number information may be obtained from the cartridge volser column of the data structure of Table III. Moves candidates are data tape cartridges that exist in a library string having a delta that is a negative value.

Determine whether the candidate volume/serial number is not in the same library string is performed to identify a possible move (step 506). Moving data tape cartridges within the same library string may not create the balance desired. When a determination is made that the candidate volume/serial number is not in the same library string, a "yes" is obtained. When a determination is made that the candidate volume/serial number is in the same library string, a "no" is obtained. When a "no" is obtained in step 506, process 500 loops back to step 504 to identify another candidate volume/serial number to move. When a "yes" is obtained in step 506, identify the set of unique identifiers, volume/serial numbers, of the data tape cartridges according to the number of data tape cartridge mounts per data tape cartridge is the highest is performed (step 508). A set of data tape cartridges may result from the process ranked according to the number of mounts for each data tape cartridge in the set of candidates. The set of data tape cartridges with the highest mounts may be then be processed according to a ranking to satisfy the move requirements.

Identify the unique identifiers, volume/serial numbers, within the set of data tape cartridges with the highest mounts where the number of moves for a respective data tape cartridge is the lowest is performed to identify the data tape cartridge that has also been moved the least (step 510). Cartridges that are moved frequently typically indicate an inefficient allocation of cartridges within the tape library system. From the candidates identified, select the unique identifiers, volume/serial numbers, to move to meet the move requirements indicated in Table III is performed (step 912). On completion of the selection return to step 414 of process 400 of FIG. 4.

One or more illustrative embodiments provides a capability to identify a situation in an automated tape library system in which balancing of the data tape cartridges across tape library strings is performed. Using statistics from the tape library system the current number of data tape cartridges mounts can be determined and compared to desired or target data tape cartridge mounts. Responsive to a delta from the comparison process, move candidates are identified and further processed to select the data tape cartridges having the most mounts while also having the least moves. The selected data tape cartridges are then moved by the tape library system to balance the allocation of data tape cartridges within the system. The moved data tape cartridges are also marked as moved to update the tape library system statistics. Balancing may also refer to meeting other criteria such as preferred strings having more or less activity as desired rather than an equilibrium scenario.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for balancing data tape cartridge utilization in an automated tape library system comprising a plurality of library strings, the computer-implemented method comprising:

obtaining a current number of data tape cartridge mounts per library string in the automated tape library system to form a total number of mounts per library string;

identifying a target number of data tape cartridge mounts per library string as equal to the number of drives per library string multiplied by the number of total mounts in the automated tape library system and divided by the total number of drives in the automated tape library system to form the target number of data tape cartridge mounts per library string;

identifying a delta number of data tape cartridges to move, as a difference between the total number of mounts per library string and the target number of data tape cartridge mounts per library string;

identifying a number of data tape cartridge mounts per data tape cartridge per library string to form the number of tape data cartridge mounts per data tape cartridge;

identifying a unique identifier of each move candidate, wherein a move candidate is a tape data cartridge in a tape library string having a delta number greater than zero;

determining whether a unique identifier of a tape library string associated with the unique identifier of the each move candidate is different from a unique identifier of a tape library string to which a move candidate will be moved;

responsive to a determination that the each move candidate is not in the same library string, identifying a set of unique identifiers of data tape cartridges associated with the number of data tape cartridge mounts per data tape cartridge, to form a set of highest mount unique identifiers;

selecting a set of data tape cartridges to move, wherein each data tape cartridge in the set of data tape cartridges to move is selected from the set of highest mount unique identifiers having a lowest number of moves, to form the selected set of data tape cartridges;

creating a move request for the selected set of data tape cartridges to form a created move request;

sending the created move request to the automated tape library system for execution;

moving each data tape cartridge in the set of data tape cartridges to another tape library string according to the move request; and incrementing a move counter for each data tape cartridge moved.

* * * * *